INVENTOR
Charles A. Upson
BY
his ATTORNEYS

INVENTOR
Charles A. Upson
BY
his ATTORNEYS

April 2, 1929.  C. A. UPSON  1,707,375
MACHINE FOR MAKING SHEETS AND BOARDS
Filed Oct. 15, 1926  5 Sheets-Sheet 5
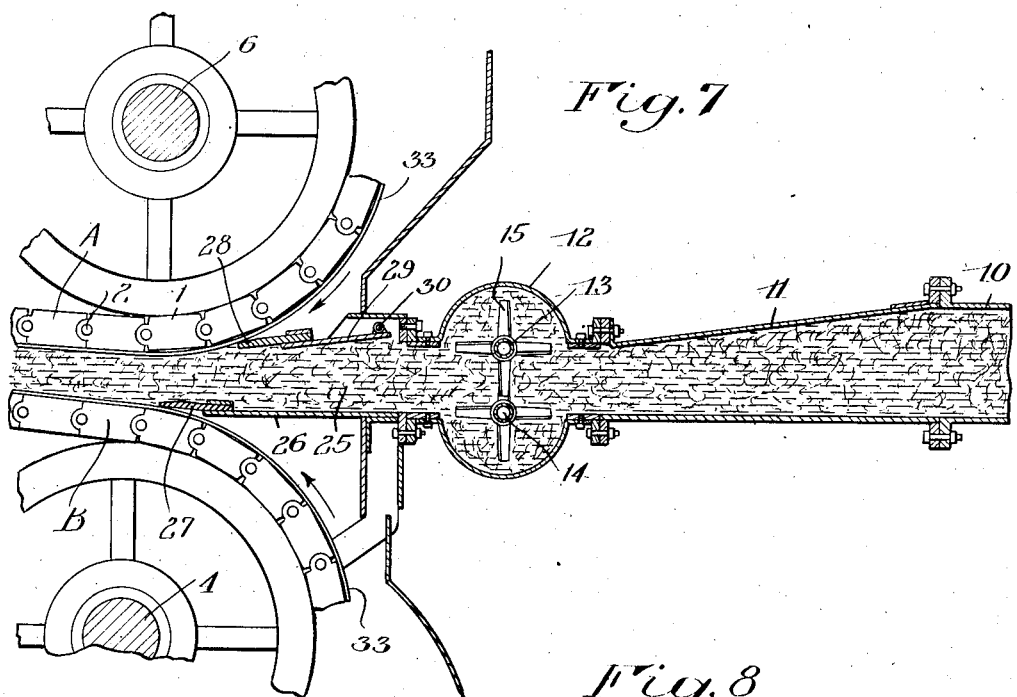
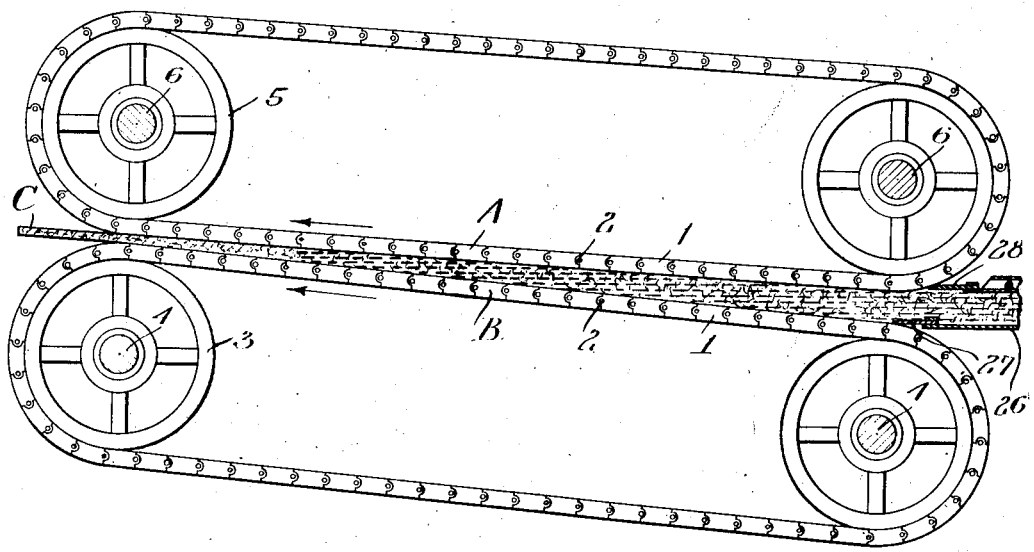
INVENTOR
Charles A. Upson
BY
his ATTORNEYS Patented Apr. 2, 1929.

1,707,375

UNITED STATES PATENT OFFICE.

CHARLES A. UPSON, OF LOCKPORT, NEW YORK, ASSIGNOR TO THE UPSON COMPANY, OF ROCHESTER, NEW YORK, A CORPORATION OF NEW YORK.

MACHINE FOR MAKING SHEETS AND BOARDS.

Application filed October 15, 1926. Serial No. 141,831.

My present invention relates to machines for moulding or forming articles or compounds from plastics, and more particularly to machines for making wall board, artificial lumber or products of this general nature from paper stock, such as wood fibre or from plastic materials generally used with or in substitution for paper fibre, and my invention has for its object to provide a simple, efficient and durable machine of this character. The improvements are directed particularly to means for so agitating and mixing the material that is fed into the machine as to cause it to be presented to the actual forming mechanism as a thoroughly homogeneous mass.

To these and other ends the invention resides in certain improvements and combination of parts, all as will be hereinafter more fully described, the novel features being pointed out in the claims at the end of the specification.

In the drawings:

Fig. 7 is a view similar to Fig. 5 showing the manner in which the material progresses at the receiving end of the machine; and Fig. 8 is a view on a smaller scale showing the manner in which the material is compressed and issues from the machine as a finished product, the same being in longitudinal section in a plane indicated generally in the line 8—8 of Fig. 2.

Similar reference numerals throughout the several views indicate the same parts.

Figure 1:
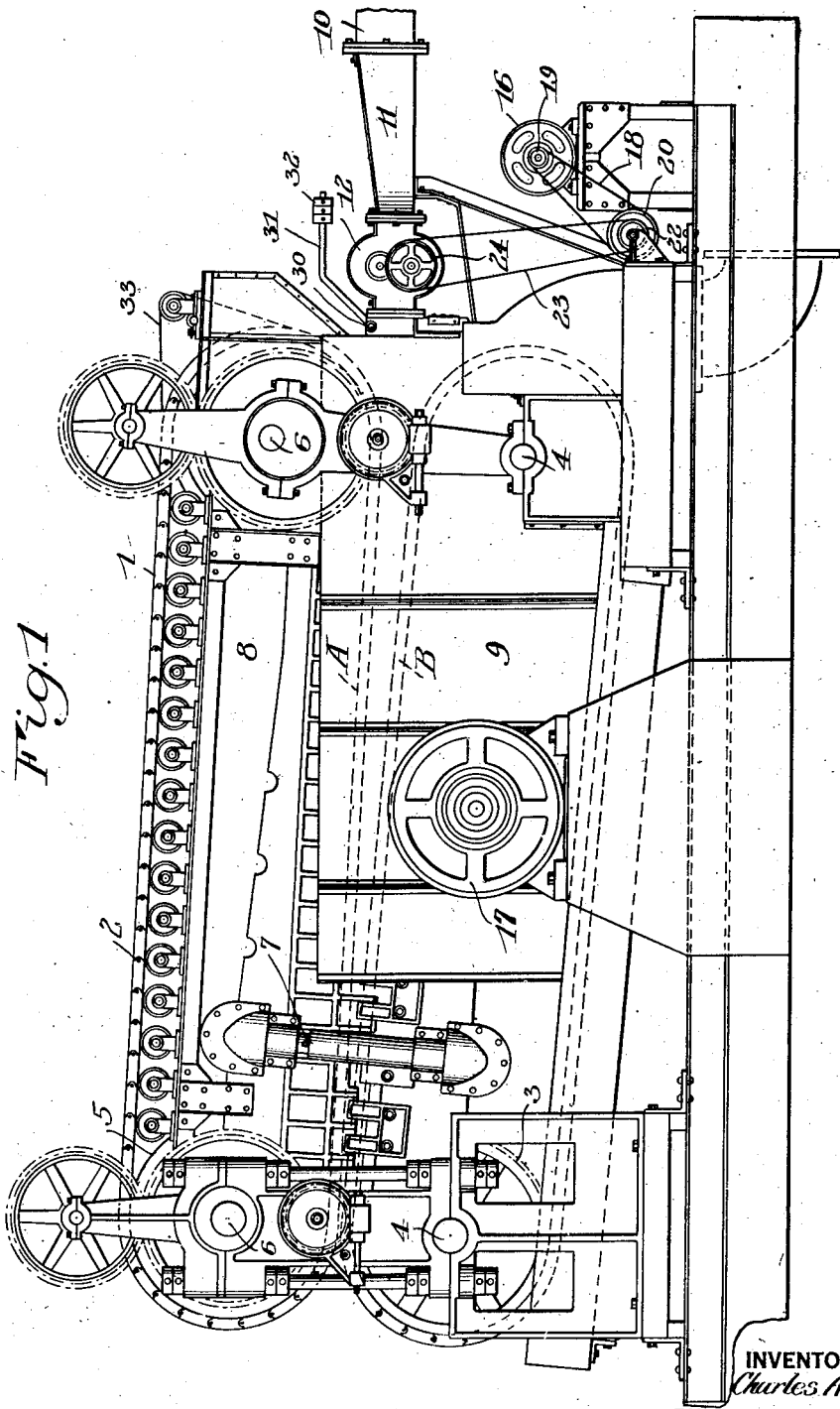
Fig. 1 is a side elevation of a board forming machine constructed in accordance with and illustrating one embodiment of my invention.

The present machine may be used for forming solid products such as heavy paper, wall board or the so called "artificial lumber" from plastic materials of different kinds. The present machine has been designed for the particular purpose of forming heavy fibre board or artificial lumber from paper pulp, that is vegetable fibres suspended in and mixed with water. The general idea of the machine is that the fibres, in the plastic state, are fed in under pressure between converging, travelling surfaces, so that an excess of water or moisture is gradually squeezed out and the board or other product emerges from the delivery end of the machine in a solid state though later dried or otherwise treated.

Inasmuch as the material as fed into the machine (being in the present case a suitable paper stock) is partly solid and partly liquid it is important that a thorough agitation should occur before the purely mechanical means come into action to compress the fibres and express the excess of water from the plastic, semi-plastic or liquid pulp. To these ends I have provided the following mechanism:

Referring first to Figures 7 and 8, I provide a pair of travelling, converging, flat compression surfaces A and B. These are preferably composed of a number of articulated perforated plates 1 pivoted together at 2 and suitably supported in guides (not shown) so as to conjointly provide the two plain converging surfaces previously mentioned. These plates are in the nature of continuous chains or conveyors, the lower set B travelling over sprockets 3 on shafts 4 and the upper set travelling over sprockets 5 on shaft 6. The pairs of shafts and sprockets 3—4 and 5—6 are adjustable toward and from each other in a manner that has nothing to do with the present invention but which involves a screw indicated generally at 7 (Fig. 1) attached to the two frames 8 and 9 which respectively carry the bearing of the two sets of shafts 4 and 6. The articulated members or compressers as they may be called travel conjointly in a direction indicated by the arrows in Figures 7 and 8 and material fed between them is gradually compressed as indicated by the convergence of the members so that the bulk admitted at the feed end of the machine emerges from the opposite end in a solid state.

Figure 4:
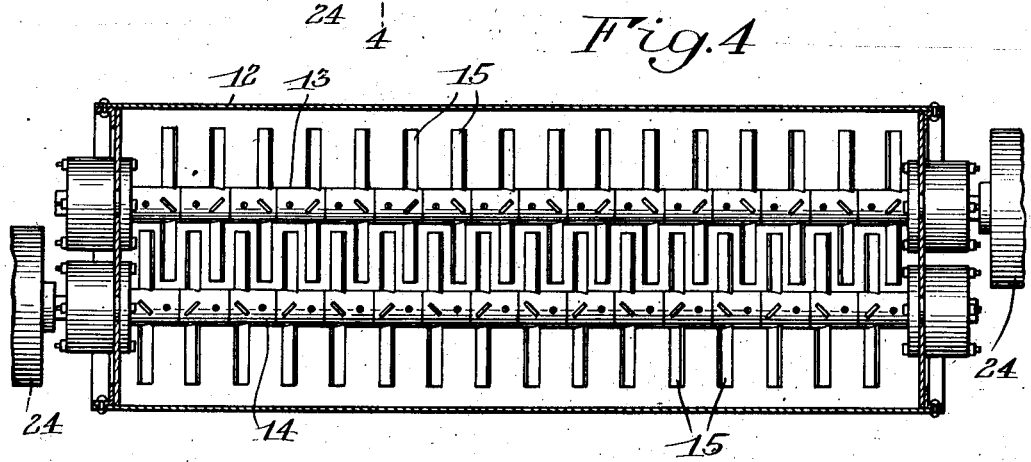
Fig. 4 is a section on the line 4—4 of Fig. 3.
Figure 6:
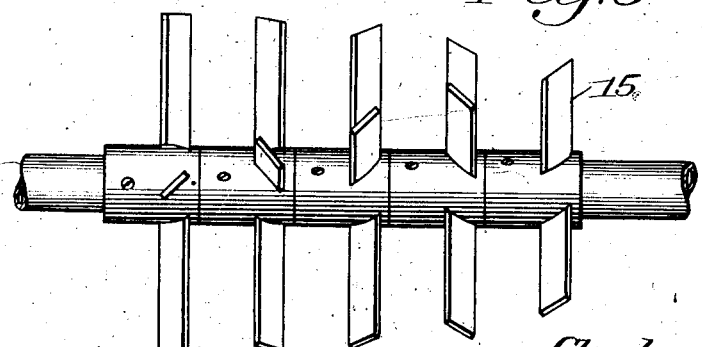
Fig. 6 is an enlarged fragmentary view of one of the beaters that I employ.

Assuming, as in the present instance, that such material is wood fibre mixed with water, such mixture enters the machine from a suitable source at 10 (Figures 1 and 7). There is there provided a throat 11 that embodies a box diverging from the supply pipe 10. At the forward end of this box is a chamber 12 through which the material passes just before it goes between the articulated surfaces A—B. A pair of shafts 13 and 14 are extended through this chamber in spaced relationship and each one carries a plurality of beaters or blades 15, those on one shaft being arranged to pass between those on the other shaft when the two shafts are simultaneously driven as best shown in Figure 4. I prefer to make the beaters or the blades 15 of the form shown in Figure 4 although they may be angularly disposed as illustrated in Figure 6.

Figure 2:
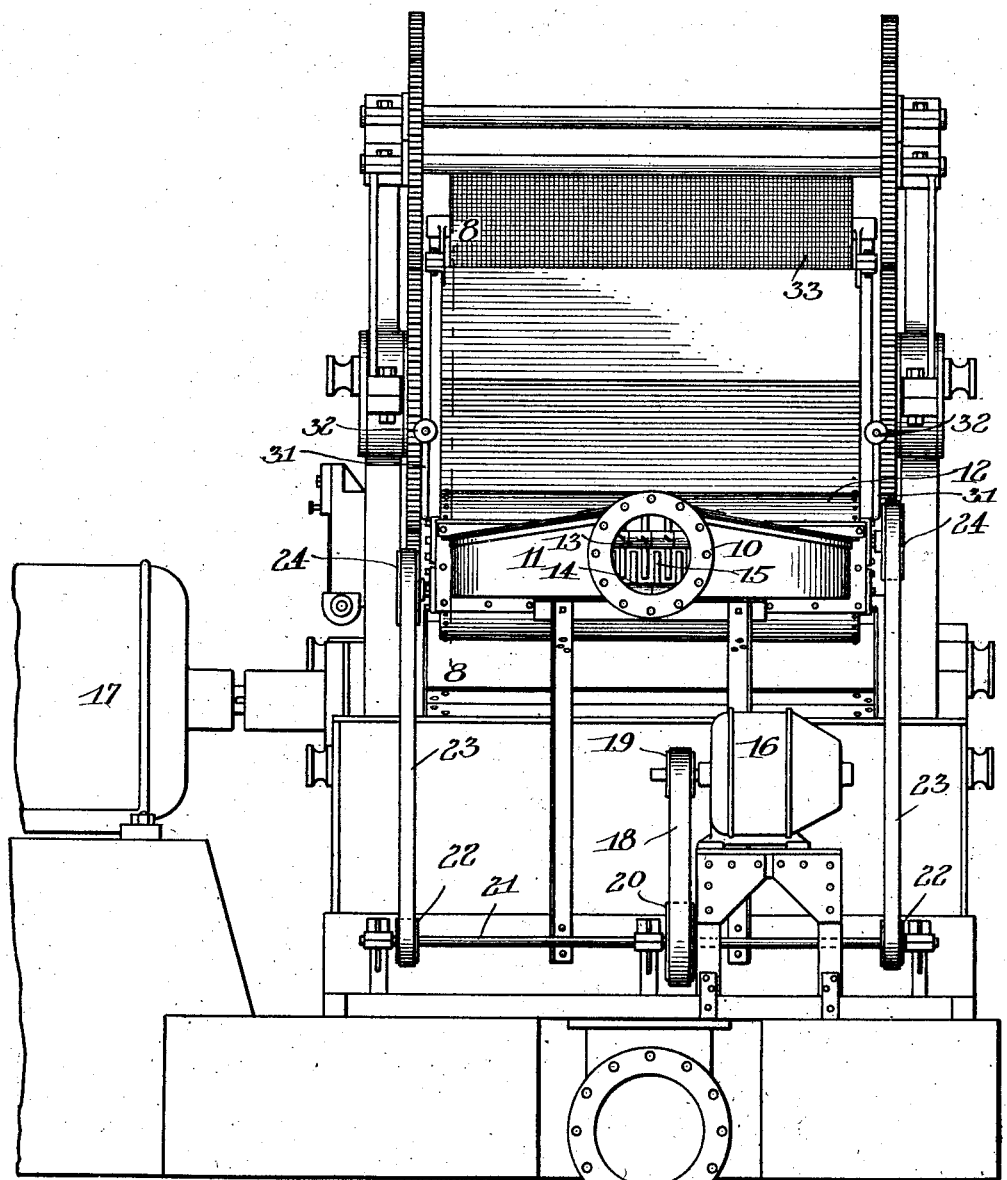
Fig. 2 is a rear end view of the said machine and by rear end I mean the feeding end.
Figure 3:
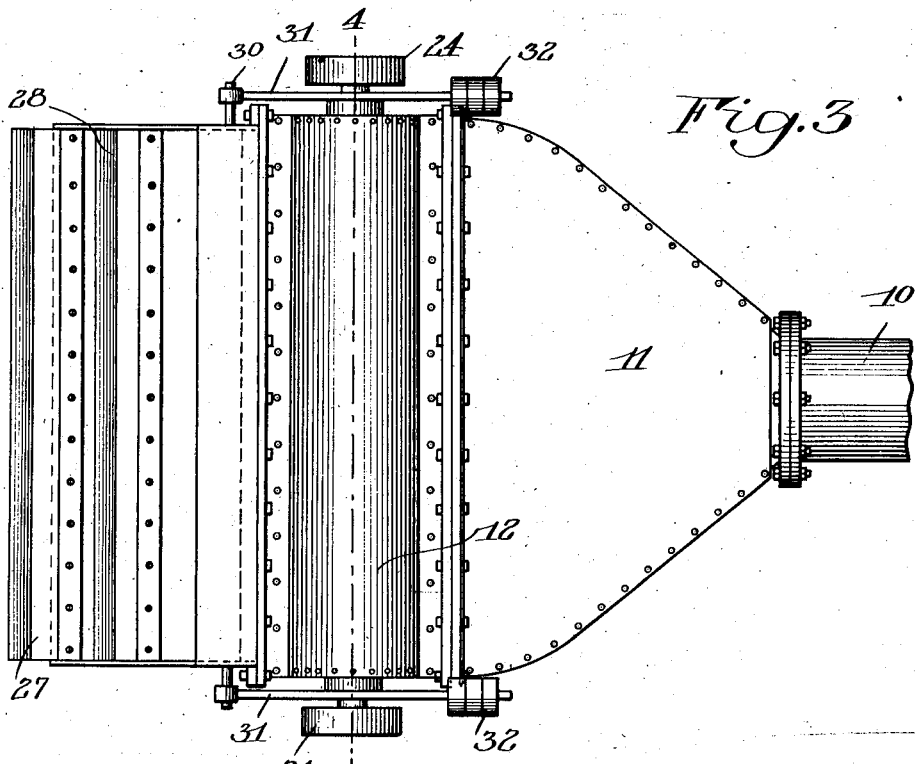
Fig. 3 is a top plan view of the feeding throat, enlarged.

The shafts 13 and 14 are driven preferably at a relatively high speed for which purpose an independent motor 16 is provided as shown in Figure 2. The motor for driving the machine in general is shown at 17 in the same figure. A belt 18 from the shaft of the motor 16 through pulleys 19 and 20, drives a jack shaft 21 provided with pulleys 22 from which belts 23 drive shafts 13 and 14 by means of pulleys 24 attached to them, said shafts being thus driven so that the cooperating blades 15 travel in opposite directions.

Figure 5:
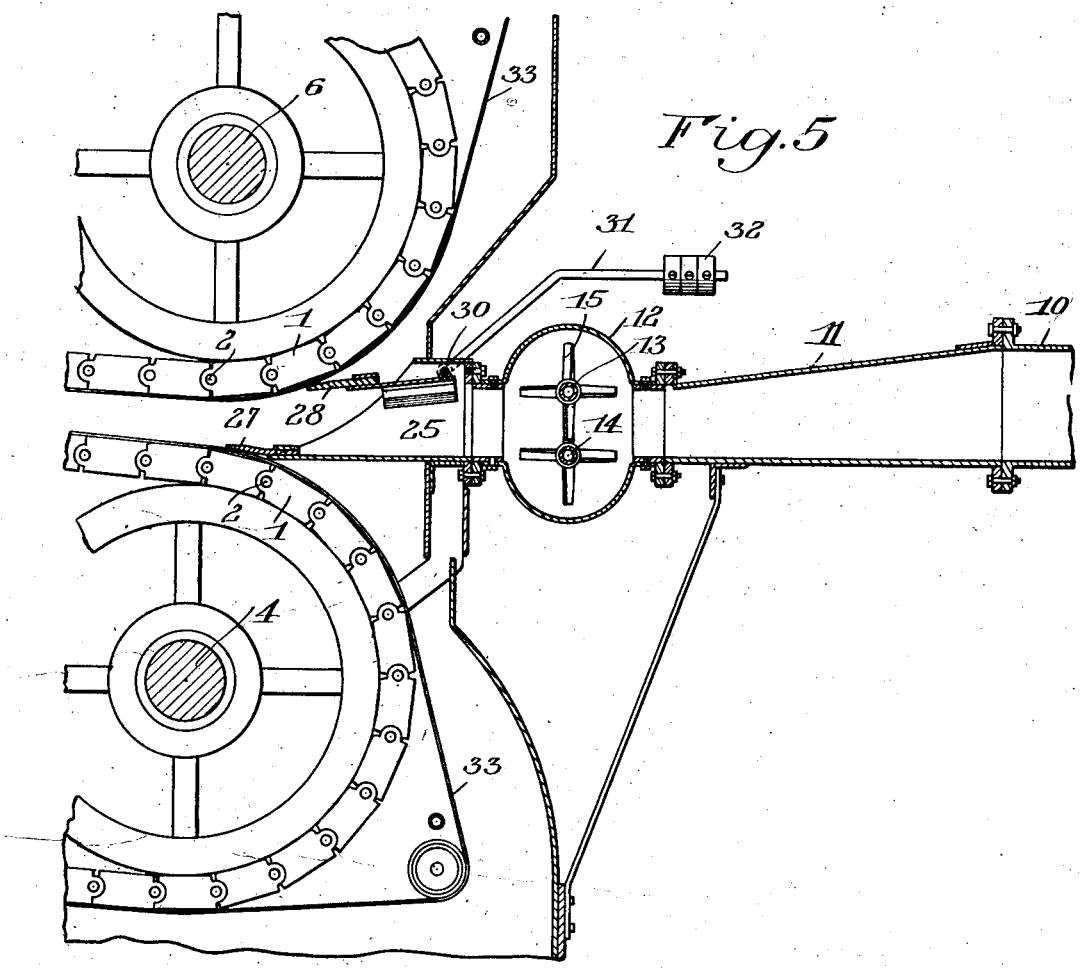
Fig. 5 is an enlarged longitudinal section through the feeding throat showing fragments of the adjacent portion of the forming mechanism.

The course of the material from the throat 11 and into the beater chamber 12 and thence on into the compression chamber A—B is through a passage indicated at 25 and best shown in Figures 5 and 7.

Inasmuch as the surfaces A—B formed by the articulated members 1 are travelling on approaching curves as they come off the rear sprockets 3 and 5 it is necessary to provide a self adapting means for directing the flow of material from the throat 11, beating chamber 12, and passage 25 into the compression chamber. To this end I provide at the end of the bottom wall 26 of the passage way 25 a rubber or other flexible element 27 which rides on the lower flight B of the compression elements 1 as they come off of the lower ear sprocket 4. Similarly a rubber or equivalent blade 28 rides against the upper flight as the compression elements 1 come off the upper ear roller 5. This element 28 is carried on a plate 29 which constitutes the upper wall of the passage 25. The plate 29 pivots on a shaft 30 which shaft (Figures 5 and 7) is provided with arms 31 fitted with weights 32. The function of the shaft, weights, and arms is to form a liquid-tight contact at the top of the passage 25 with the travelling element A. Between the two of them, the contact members 27 and 28 serve to guide the plastic, liquid or semi-liquid material between the moving compression elements A—B. When adjustments are made between the shafts 4 and 6 at the rear end of the machine to regulate the thickness of the product, floating element 28 weighted on its pivot adapts itself to a proper contact to tightly maintain the passage way 25 into the compression chamber.

Preferably aprons 33 are provided on the surfaces of the members A—B of the compression chamber which aprons are composed of wire gauze or other suitable material adapted to give the product a proper surface by their contact and yet to allow water to flow therethrough in which connection it is to be noted that the articulated elements 1 of the compression members A—B are so constructed as to permit the liquid contents of the material that is fed into the machine to flow out as the solid content is trapped and compressed between members A—B to ultimately emerge in the solid form indicated at C in Figure 8.

The general operation of the machine is as follows, the fact being borne in mind that it has been described in this particular embodiment as a machine for forming a paper product from vegetable fibres suspended in water:

The water, carrying the fibres in suspension, is introduced under suitable pressure through the feed pipe 10. It travels through the throat 11 and reaches the chamber 12. By this time, whatever its preparation the fibres or solid matter are apt to become coagulated or to have assumed a condition in which they are improperly mixed. Coming in contact with the beaters 15, in the chamber 12 they are, however, at this point thoroughly agitated and mixed just before they enter the passage 25 and pass to the compression chamber A—B. As before stated, the beaters 15 on their shafts 13 and 14 are independently driven from the motor 16 and can be given that degree of speed which is necessary to produce the results on the product as it passes to the critical point of the passage way 25 and is about to enter the compression or forming chamber.

In a machine of the character described a variety of materials may be used and operated upon although, as before stated, I have described it in this instance with particular reference to the formation of wall board, artificial lumber or similar material from paper stock, that is, wood or vegetable fibres suspended in water. An important feature of the machine, whatever the material, is the agitation of the combined solid and liquid substances immediately before they pass into a chamber in which the liquid is expressed and the solid matter is progressively compressed to ultimately emerge as a solid, self sustaining body.

I claim as my invention:

1. In a machine for forming solid products from plastic materials, the combination with a compression chamber, of a feeding throat, and means interposed between the feeding throat and compression chamber for violently agitating and mixing the material during its passage from one to the other.

2. In a machine for forming solid products from plastic materials, the combination with a compression chamber, of a feeding throat, and a rotary beater interposed between said elements to violently act upon the material as it passes from the feeding throat into the compression chamber.

3. In a machine for forming solid products from plastic materials, the combination with a compression chamber, comprising a pair of travelling, converging elements, of a feeding throat, means for supplying the current of material from said throat into the compression chamber, and an agitating device located intermediately of the throat and compression chamber for violently agitating and mixing a supply of material just before it enters the compression chamber.

4. In a machine for forming solid products from plastic materials, the combination with a compression chamber adapted to drain the liquid content of the material, of a feeding throat through which the material is introduced to such compression chamber, and an agitating chamber interposed between the throat and the compression chamber, and a beater arranged in such agitating chamber to violently agitate and mix the materials introduced immediately preceding its entrance into the compression chamber.

5. In a machine of the character described the combination with a pair of travelling elements constituting a converging pair of walls in a compression chamber, of means for feeding a combination of solid and liquid matter through said chamber, and means arranged immediately adjacent to said compression chamber for violently agitating and mixing the supply of material immediately preceding its entrance into the compression chamber.

6. In a machine of the character described, the combination with a pair of travelling elements constituting a converging pair of walls in a compression chamber, of means for feeding a combination of solid and liquid matter through said chamber, means arranged immediately adjacent to said compression chamber for violently agitating and mixing the supply of material immediately preceding its entrance into the compression chamber, means for driving the travelling elements and independent means for driving the agitating means at high speed.

7. In a machine for forming solid products from plastic materials, the combination with a pair of flexible endless elements arranged to jointly provide, in their travel, a pair of converging surfaces constituting opposite walls of a pressure chamber, and carrying rolls for said endless elements at the larger and feeding end of said chamber over which the elements pass on approaching curves, of a feeding throat, an agitating chamber arranged between the latter and the compression chamber and having an agitator therein, and yielding elements at the feeding end of the pressure chamber and between it and the agitating chamber adapted to ride upon the endless elements as they pass over the rolls and render the pressure chamber substantially water tight at these points.

CHARLES A. UPSON.